United States Patent
Temelie et al.

(10) Patent No.: US 12,234,776 B2
(45) Date of Patent: Feb. 25, 2025

(54) DOUBLE SEAL ARRANGEMENT

(71) Applicant: PRATT & WHITNEY CANADA CORP., Longueuil (CA)

(72) Inventors: Mihail Temelie, St-Hubert (CA); Gilles Fournier, Beloeil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/323,614

(22) Filed: May 25, 2023

(65) Prior Publication Data
US 2024/0392726 A1 Nov. 28, 2024

(51) Int. Cl.
| | |
|---|---|
| F02C 7/28 | (2006.01) |
| F16J 15/06 | (2006.01) |
| F16J 15/08 | (2006.01) |
| F16L 23/02 | (2006.01) |
| F16L 23/16 | (2006.01) |
| F16L 23/20 | (2006.01) |

(52) U.S. Cl.
CPC ............... *F02C 7/28* (2013.01); *F16L 23/16* (2013.01); *F16J 15/061* (2013.01); *F16J 15/0831* (2013.01); *F16L 23/02* (2013.01); *F16L 23/20* (2013.01)

(58) Field of Classification Search
CPC ....... F16J 15/0831; F16J 15/061; F16L 23/16; F16L 23/02; F16L 23/024; F16L 23/032; F16L 23/20; F16L 23/18
See application file for complete search history.

(56) References Cited

U.S. PATENT DOCUMENTS

| | | | | |
|---|---|---|---|---|
| 1,704,939 | A | * | 3/1929 | Grauel .................... F16L 23/02 |
| 3,108,818 | A | | 10/1963 | Furstenburg |
| 3,588,131 | A | | 6/1971 | Nicholson |
| 3,727,955 | A | * | 4/1973 | Carter .................... F16L 23/02 |
| 3,738,558 | A | * | 6/1973 | Colwell |
| 4,088,347 | A | | 5/1978 | Bruggermann et al. |
| 4,570,440 | A | * | 2/1986 | Doran .................... F16L 23/16 |
| 5,203,576 | A | * | 4/1993 | Miyaoh .................. F16J 15/061 |
| 5,333,884 | A | | 8/1994 | Miyaoh et al. |
| 5,524,906 | A | | 6/1996 | Rackov et al. |
| 6,386,593 | B1 | * | 5/2002 | Slais ...................... F16L 23/18 |

(Continued)

FOREIGN PATENT DOCUMENTS

EP 1719945 A1 11/2006

OTHER PUBLICATIONS

European Search Report issued in EP counterpart application No. 24177264.9 on Oct. 9, 2024.

*Primary Examiner* — William S. Choi
(74) *Attorney, Agent, or Firm* — NORTON ROSE FULBRIGHT CANADA LLP

(57) ABSTRACT

A tube assembly comprises a tube having a tube flange securable to an associated mounting surface of a turbine engine component. A first seal is provided at the bore interface between the tube and a fluid port of the engine component. A second seal is provided at the flange interface between the tube flange and the tube mounting surface of the engine component. The second seal includes a gasket having a sheet metal body with corrugations projecting from the tube facing side of the gasket. Tabs are distributed along a periphery of the gasket for resiliently holding the gasket on the tube flange with the tube facing side of the gasket facing the tube flange.

19 Claims, 4 Drawing Sheets

(56) References Cited

U.S. PATENT DOCUMENTS

2012/0139189 A1\* 6/2012 Schweiger ............ F16J 15/0831
2018/0252246 A1\* 9/2018 Kojima .................. F16J 15/061
2018/0328257 A1\* 11/2018 Panak ................... F16L 23/032
2019/0162337 A1   5/2019 Ishibashi et al.

\* cited by examiner

FIG_1

DOUBLE SEAL ARRANGEMENT

TECHNICAL FIELD

The application relates generally to a double seal arrangement and, more particularly, to a double seal arrangement including a self-attaching gasket at a flange interface between a tube fitting and an engine component of a gas turbine engine.

BACKGROUND OF THE ART

Fluid lines are used to route various fluids (e.g., air, oil or fuel) throughout a gas turbine engine. Certain portions of fluid lines, such as tubes, may be detachably coupled to other portions of fluid lines and/or to engine structures, such as engine accessories and engine casings. In some cases, access and visibility to the tube coupling interface during the time of assembly may be restricted. Such situations impose challenges for the proper positioning of a seal at the coupling interface prior to torquing the tube to the adjoining engine component.

SUMMARY

In one aspect, there is provided a tube assembly for a gas turbine engine, comprising: a tube having a tube end and a tube flange projecting from the tube end to a peripheral wall circumscribing the tube flange; an engine component having a tube mounting surface surrounding a fluid port fluidly connected to the tube, the tube end engaged in the fluid port and defining a bore interface therebetween, a flange interface defined between the tube mounting surface and the tube flange; a first seal at the bore interface between the tube and the fluid port of the engine component; a second seal at the flange interface between the tube flange and the tube mounting surface of the engine component, the second seal including a gasket, the gasket having: a sheet metal body having a tube facing side and an engine component facing side opposite to the tube facing side; corrugations projecting from the tube facing side; and tabs distributed along a periphery of the sheet metal body, the tabs spring loaded against the peripheral wall of the tube flange, the tabs resiliently holding the gasket on the tube flange with the tube facing side of the gasket facing the tube flange; and fasteners securing the tube flange to the tube mounting surface of the engine component, the fasteners holding the gasket in compression between the tube flange and the tube mounting surface.

In another aspect, there is provided a dual seal arrangement between a tube fitting and an accessory of a gas turbine engine, comprising: an O-ring at a bore interface between the tube fitting and a fluid port of the accessory; and a metal gasket at a flange interface between a flange of the tube fitting and the accessory, the metal gasket having: a tube fitting side and an accessory facing side; deformable corrugations projecting from the tube fitting side; spring-loaded tabs distributed about a perimeter of the metal gasket, the spring-loaded tabs projecting outwardly from the tube fitting side and disposed for firmly resiliently grasping a peripheral wall of the flange of the tube fitting; and a first and a second bolt hole disposed on opposed sides of a central hole, the central hole concentric with the O-ring at the bore interface, the spring-loaded tabs disposed around the central hole in diametrically opposed pairs, the first and second bolt holes disposed between adjacent ones of the spring-loaded tabs.

DESCRIPTION OF THE DRAWINGS

Reference is now made to the accompanying figures in which.

DETAILED DESCRIPTION

Figure 1:
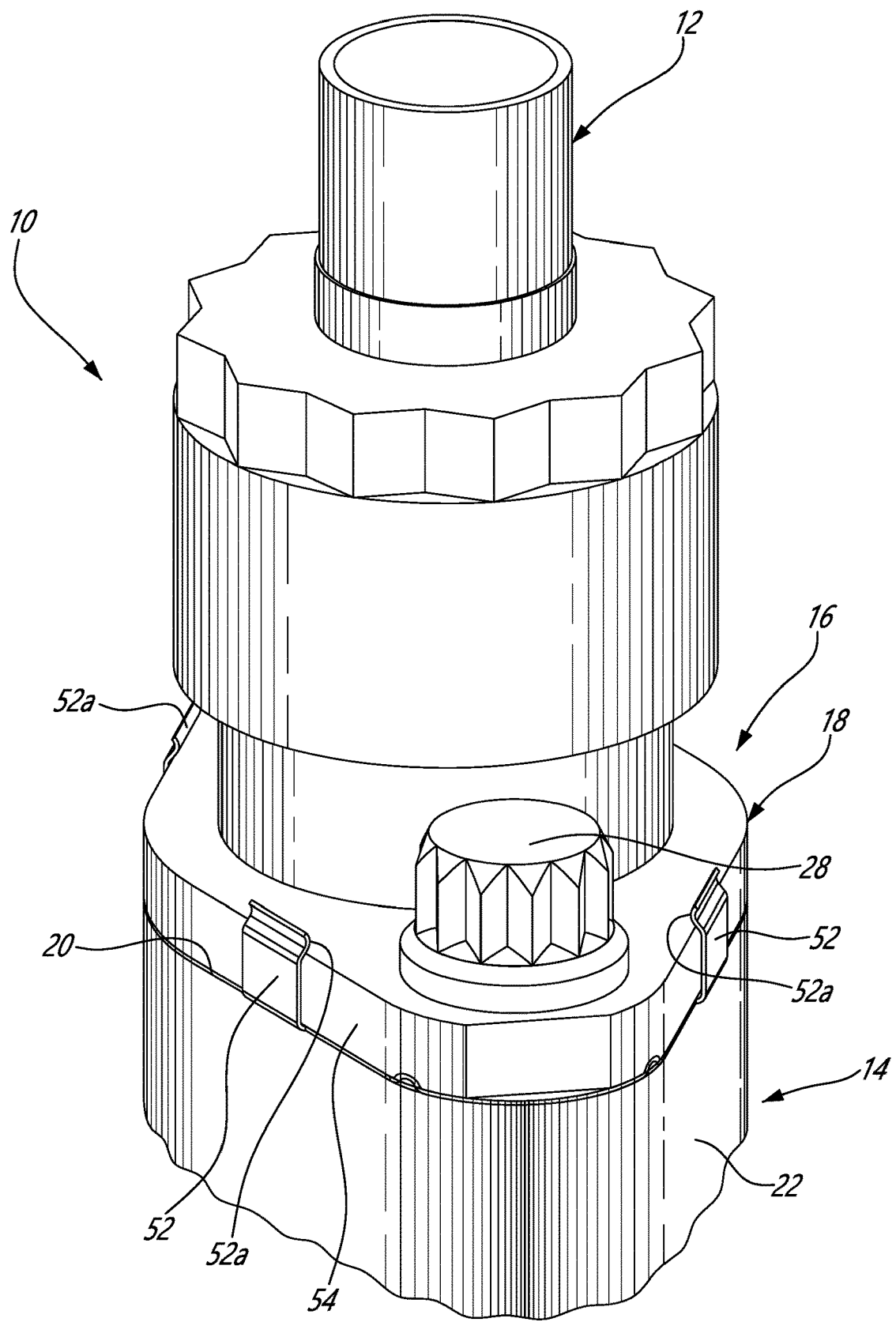
FIG. 1 is an isometric view of a tube assembly for a gas turbine engine.

FIG. 1 illustrates an embodiment of a tube assembly 10 comprising a tube 12 fluidly and mechanically connected to an engine component 14, such as an engine accessory (e.g., a heat exchanger, a pump, a sensor, etc.) or an engine case of a gas turbine engine. For instance, the tube assembly 10 may be used for providing double sealing to tube-to-boss fittings for oil, fuel, air systems of gas turbine engines. According to some embodiments, the tube assembly 10 is suited for use with stainless steel tubes having an outer diameter (O.D.) up to 0.375" (e.g., 0.25" or 0.375").

Figure 2:
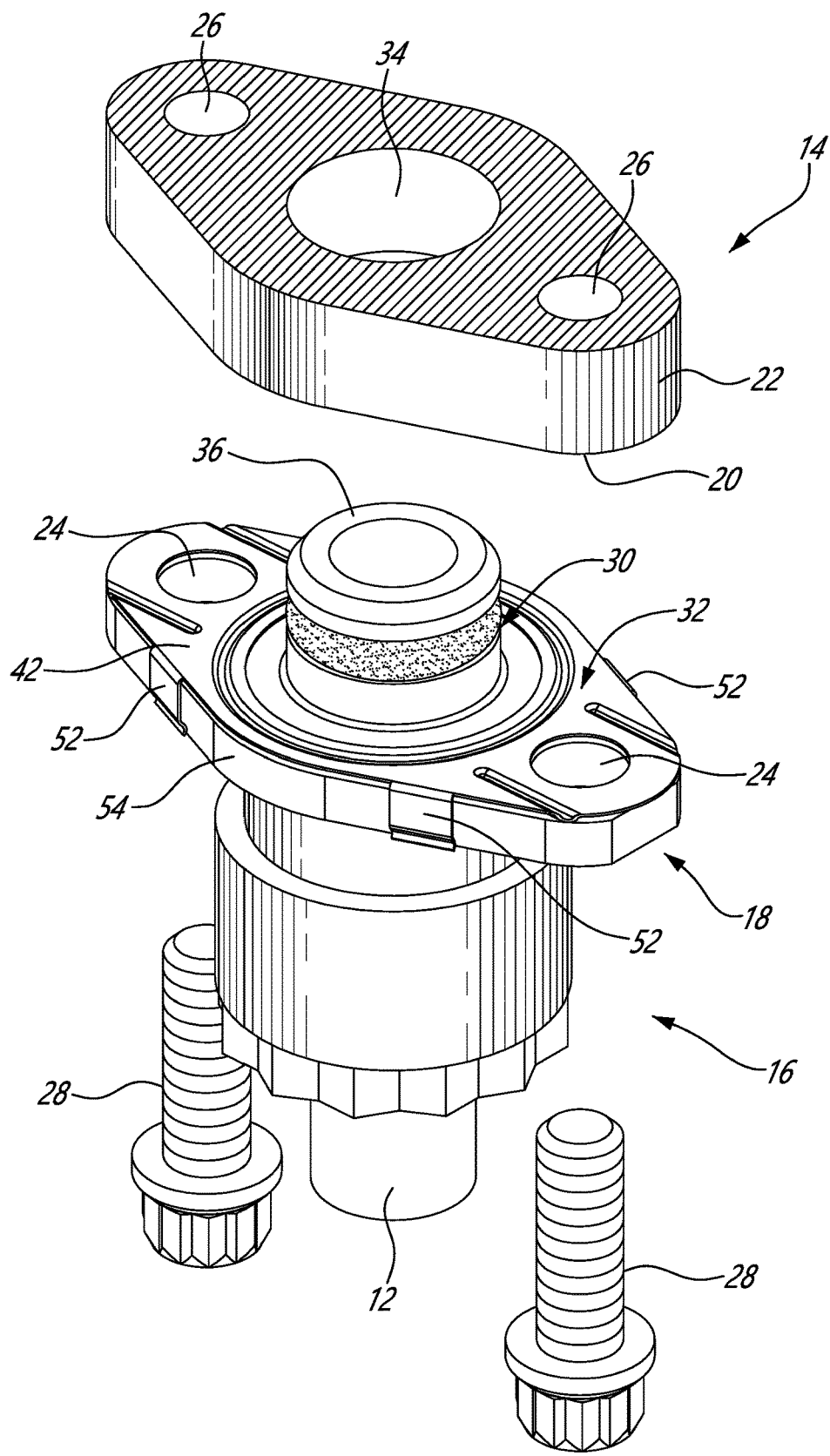
FIG. 2 is an exploded view of the tube assembly and illustrating details of a dual seal arrangement including a self-attachable metal gasket clipped on a 2-bolt flange of a tube fitting.

Referring to FIGS. 1 and 2, it can be seen that the tube assembly 10 comprises a tube fitting 16 having a tube flange 18 adapted to be detachably secured, such as by bolting or the like, to a corresponding mounting surface 20 of the engine component 14. The mounting surface 20 can be provided on a boss 22 projecting from an outer surface of the engine component 14. The tube flange 18 and the mounting surface 20 can include pairs of registering bolt holes 24, 26 (FIG. 2) for receiving corresponding bolts 28. According to the illustrated embodiment, the flange connection is a 2-bolt flange connection. However, it is understood that a different bolt pattern could be provided. In addition, it is understood that other suitable fasteners could be used to detachably secure the tube flange 18 to the mounting surface 20 of the engine component 14. For instance, threaded studs could extend from the mounting surface 20 for engagement in corresponding holes in the tube flange 18 and nuts could be installed on the threaded studs and torqued to securely press the tube flange 18 against the mounting surface 20.

Referring to FIG. 2, it can be appreciated that the tube assembly 10 has a double or dual seal arrangement including a first seal 30 and a second seal 32 disposed in series to prevent possible leaks at the exemplified tube-to-boss fitting connection. According to some embodiments, the first seal 30 is provided in the form of an O-ring to provide sealing at a tube-to-bore interface between the inner diameter surface a fluid port 34 of the engine component 14 and an outer diameter surface of a tubular end portion 36 of the tube fitting 16. The O-ring can be provided in the form of a so-called piloted O-Ring. According to some embodiments, the O-ring is mounted in an annular groove defined in the outer diameter surface of the tubular end portion 36 of the tube fitting 16 prior to engaging the tubular end portion 36 in the fluid port 34 of the engine component 14. The first seal 30 may be damaged at installation or during engine running and a possible leak can develop. The second seal 32 is added to provide sealing if the first seal is leaking. The second seal 32 is configured to provide sealing at the flange interface between the tube flange 18 and the mounting surface 20 of the engine component 14. As will be seen hereinafter, the second seal 32 may be provided in the form of a self-attaching metal gasket adapted to be manually pre-installed (without any tools) in a single predetermined orientation/position on the tube flange 18 of the tube fitting 16.

Figure 3:
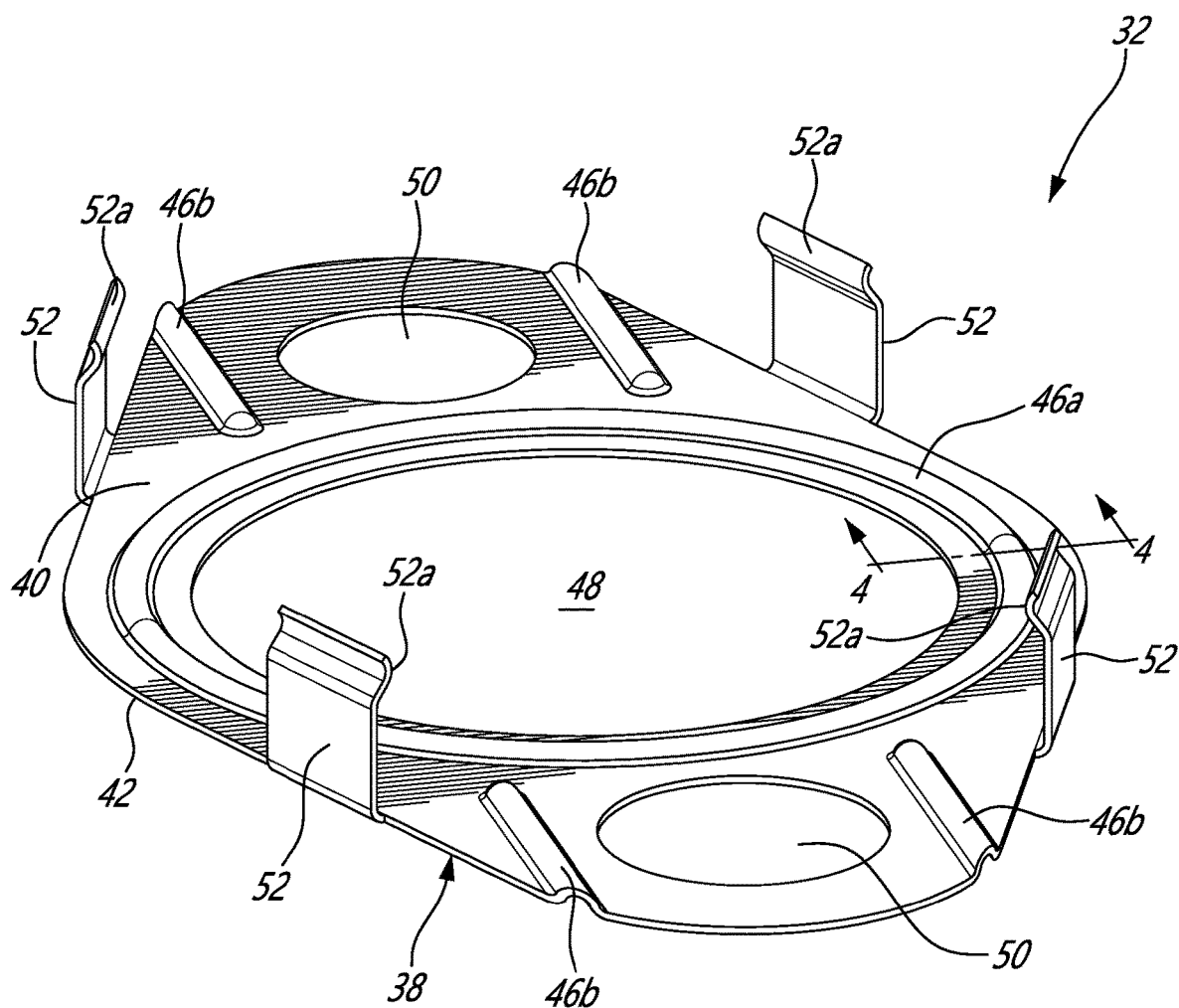
FIG. 3 is an isometric view of the self-attachable metal gasket.
Figure 4:
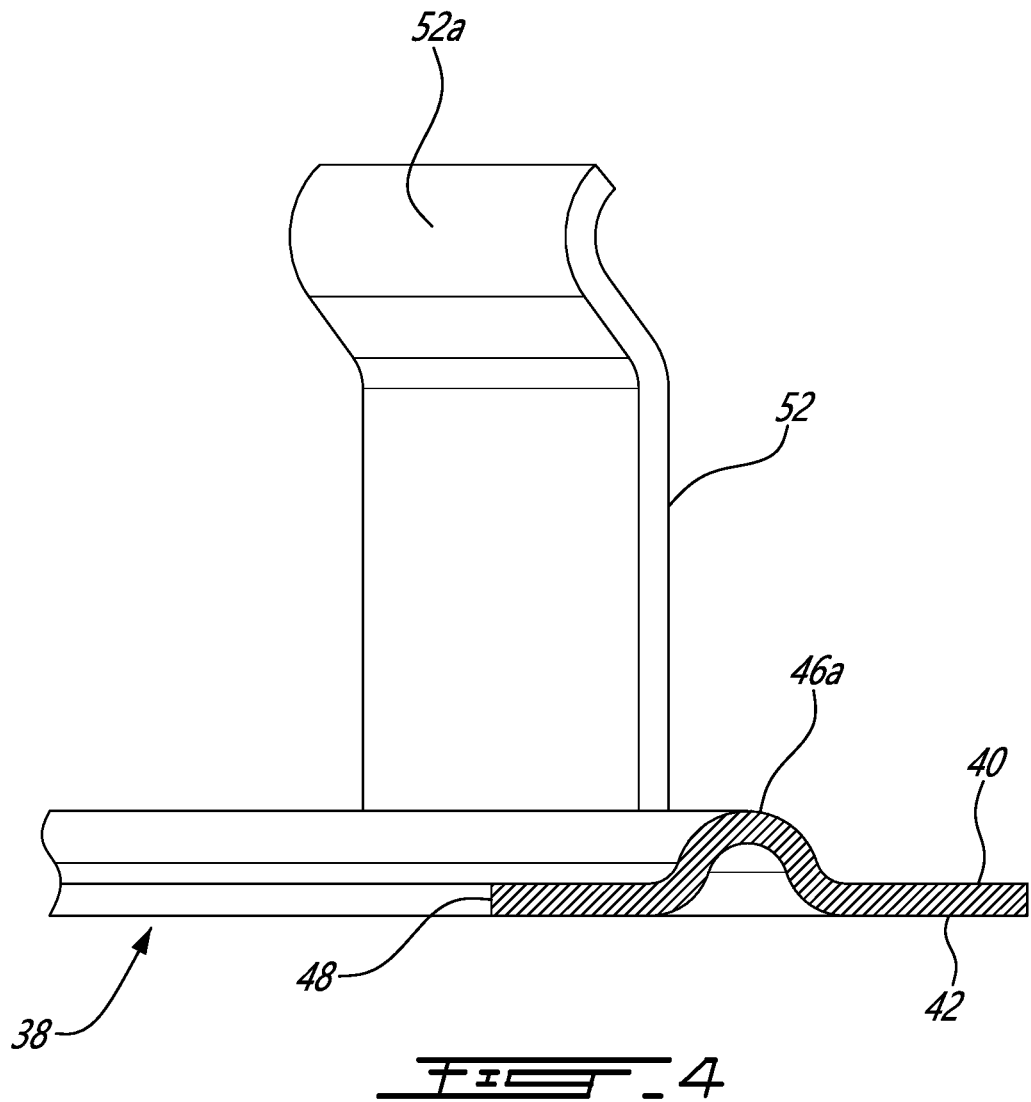
FIG. 4 is a cross-section taken along line 4-4 of FIG. 3.

FIG. 3 illustrates an embodiment of the metal gasket. The metal gasket has a flat sheet metal body 38 having a tube facing side 40 and an engine component facing side 42 opposite to the tube facing side 40. The sheet metal body 38 has a shape and a surface area corresponding to the shape and surface area of the tube flange 18. Corrugations 46a, 46b in the form of rounded bumps or the like project from the tube facing side 40. The corrugations 46a, 46b may be embossed or otherwise suitable integrally formed on the sheet metal body 38. According to the some embodiments, the corrugations 46a, 46b include an annular corrugation 46a encircling a central hole 48 defined in the sheet metal body 38 to receive the tubular end portion 36 of the tube fitting 16. The central hole 48 and the annular corrugation 46a are concentric. The corrugations 46a, 46b further include first and second pairs of linear or straight corrugations 46b disposed outside of the annular corrugation 46a. First and second bolt holes 50 are disposed between the linear corrugations of the first pair and the second pair of linear corrugations 46b, respectively. The bolt holes 50 are disposed for registry with the associated bolt holes 24 in the tube flange 18 on opposed sides of the tubular end portion 36 of the tube fitting 16. According to some embodiments, the linear corrugations 46b extend from the peripheral edge of the sheet metal body 38 inboard towards the annular corrugation 46a. The length of linear corrugations 46b may be selected to fully span the bolt holes 50 they are neighboring. The inner end of the linear corrugations 46b is however spaced from the annular corrugation 46a in order not to interfere with the deformation of the annular corrugation 46a when the bolts 28 are torqued to compress the metal gasket between the tube flange 18 and the mounting surface 20 of the engine component 14. As shown in FIGS. 3 and 4, the annular corrugation 46a and the linear corrugations 46b can have different shapes and/or cross-section profiles to provide for different deformation behavior when clamped between the tube flange 18 and the mounting surface 20 of the engine component 14. For instance, the annular corrugation 46a may be shaped and configured so as to be subject to elastic deformation only when the bolts 28 are torqued to a pre-calibrated installation torque. On the other hand, the linear corrugations 46b may be shaped and configured to be subject to elastic and/or plastic deformation under the same pre-calibrated torque. According to another embodiment, the profile of the annular corrugation 46a may be designed to provide for a plastic deformation of the annular corrugation 46a under that same pre-calibrated torque. Various combinations of the corrugation profiles are contemplated.

The metal gasket further comprises a plurality of tabs 52 distributed along the perimeter of the sheet metal body 38. Like the corrugations 46a, 46b, the tabs 52 project out from the plane of the sheet metal body 38 on the tube facing side 40 (i.e. the tabs 52 and the corrugations 46a, 46b are on the same side of the metal gasket). As shown in FIGS. 1 and 2, the tabs 52 are operable to tightly fit around and resiliently grasp the contour or peripheral wall 54 of the tube flange 18. In this way, the metal gasket can be readily snapped in position on the tube flange 18 without the use of any tool. The tabs 52 are spring loaded so as to exert a retention force against the peripheral wall 54 of the tube flange 18, thereby providing for a self-attaching metal gasket. This is particularly useful for use in difficult access areas. The tabs 52 ensure that the metal gasket is properly positioned on the tube flange 18 and prevent the gasket from being inadvertently displaced out of position while the tube flange 18 is bolted to the engine component 14. The tabs 52 centralize the metal gasket on the tube flange 18, thereby providing for a self-positioning gasket. In this way, a tighter fit can be provided for the central hole 48 and the bolts holes 50 and as such, a smaller flange "footprint" can be used since the need to accommodate stack-up tolerances is reduced. Accordingly, smaller tube flanges can be used. This translates in weight savings.

The tabs 52 also act as a mistake-proof feature. Indeed, the presence of the tabs 52 ensures that the metal gasket is installed on the tube flange 18 with the tube facing side 40 of the sheet metal body 38 facing the tube flange 18 that is with the corrugations 46a, 46b pressed against the tube flange 18. According to some embodiments, the mounting surface 20 of the engine component 14 can be made of a material that is softer than the materials used for the tube flange 18 and the metal gasket. For instance, the engine component 14 can be made out of aluminum, whereas the tube flange 18 and the metal gasket can be made out of stainless steel. In such instances, it is desirable that the metal gasket be installed with the corrugations facing the harder tube steel material to minimize the risk of scoring/damaging the softer aluminum engine component. The tabs 52 thus allows to mistakeproof the installation by preventing the metal gasket from being installed upside down with the corrugations 46a, 46b facing the mounting surface 20 of the engine component 14.

The tabs 52 also provide a visual indication when installed. Indeed, with this feature incorporated the mechanic/assembler will have visual confirmation that the second seal 32 is installed. As can be appreciated from FIG. 1, the tabs 52 are visible from the tube side. Furthermore, in locations where the metal gasket is installed at awkward angles or in downward directions, the tabs 52 will retain the metal gasket in position onto the tube flange 18 during the installation procedure, thereby reducing the risk that the gasket falls off the tube flange 18.

According to some embodiments, the plurality of tabs 52 includes four tabs distributed along the perimeter of the sheet metal body 38. For instance, according to the illustrated embodiment, the sheet metal body 38 of the gasket has a diamond shape including four straight sides joined by rounded corners, and the tabs 52 are disposed centrally along the straight sides. However, it is understood that the tabs 52 could be positioned at other locations along the straight sides of the sheet metal body 38. It is also understood that more than one tabs could be provided per straight sides. Still referring to the illustrated embodiment, the tabs 52 are disposed around the central hole 48 and the annular corrugation 46a. The tabs 52 can be arranged in diametrically opposed pairs around the central hole 48. In addition, as shown in FIG. 3, each pair of straight corrugations 46b can be disposed between two adjacent tabs 52 positioned on opposed side of the major axis of the diamond shape sheet metal body 38.

According to some embodiments, the tabs 52 extend at right angles from the plane of the sheet metal body 38 of the gasket. However, it is understood that other angles are possible as long as the tabs 52 remain effective for retaining the metal gasket onto the tube flange 18. As shown in FIG. 3, the tabs 52 project further way from the plane of the sheet metal body 38 than the corrugations 46a, 46b (i.e. the tabs 52 have a greater height than that of the corrugations 46a, 46b). As can be appreciated from FIG. 1, the height or length of the tabs 52 is selected to project beyond the peripheral wall 54 to a location on the top side of the tube flange 18 after the gasket has been snapped into position. Each of the tabs 52 may have a rounded lip 52a formed at a free distal end thereof, the rounded lip 52a forming an inwardly facing bump for engagement with the tube flange 18 of the tube fitting 16. As can be seen from FIG. 1, the rounded lips 52a are accessible from the top side of the tube flange 18.

In view of the foregoing, it can be appreciated at least to some embodiments, tabs 52 provide the possibility to add a self-attaching metal gasket to an existing suitable configuration, without any modifications to the tube or its adjoining interface and related hardware. This way, the probability of a leak is reduced and the overall reliability of the engine may be increased.

According to some embodiments, the thickness of the sheet metal body 38 is selected to be sufficiently small so as to minimize the stress of the tube resulting from a lost of pre-load after torquing the bolts 28. Because of the plastic and elastic deformations induced in the sheet metal body 38 when compressed between the tube flange 18 and the mounting surface 20 of the engine component 14, there is a loss of pre-load for the bolts 28. This results in a reduction of the clamping load. The reduction of the clamping load may be reduced to an acceptable level by strategically selecting the thickness of the sheet metal body 38. According to some embodiments, the sheet metal body 38 is made of stainless steel and has a thickness less than 30 thou, preferably between 5 thou and 20 thou, and more preferably of 7 thou.

According to some embodiments, an anti-friction coating is applied on the sheet metal body 38. The anti-friction coating can be applied to both the tube facing side 40 and the engine component facing side 42 or to only a selected side of the gasket. Alternatively, the sheet metal body may be entirely coated.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, the number and configurations of the tabs could be different. Yet further modifications could be implemented by a person of ordinary skill in the art in view of the present disclosure, which modifications would be within the scope of the present technology.

The invention claimed is:

1. A tube assembly for a gas turbine engine, comprising:
a tube having a tube end and a tube flange projecting from the tube end to a peripheral wall circumscribing the tube flange;
an engine component having a tube mounting surface surrounding a fluid port fluidly connected to the tube, the tube end engaged in the fluid port and defining a bore interface therebetween, a flange interface defined between the tube mounting surface and the tube flange;
a first seal at the bore interface between the tube and the fluid port of the engine component;
a second seal at the flange interface between the tube flange and the tube mounting surface of the engine component, the second seal including a gasket, the gasket having:
a sheet metal body having a tube facing side and an engine component facing side opposite to the tube facing side;
corrugations projecting from the tube facing side; and
tabs distributed along a periphery of the sheet metal body, the tabs spring loaded against the peripheral wall of the tube flange, the tabs resiliently holding the gasket on the tube flange with the tube facing side of the gasket facing the tube flange; and
fasteners securing the tube flange to the tube mounting surface of the engine component, the fasteners holding the gasket in compression between the tube flange and the tube mounting surface;
wherein the corrugations include a central annular corrugation concentric with a central hole defined in the sheet metal body of the gasket, and a first pair and a second pair of linear corrugations disposed outside of the central annular corrugation, the sheet metal body having a first bolt hole and a second bolt hole defined therethrough on diametrically opposed sides of the central hole, the first bolt hole disposed between the linear corrugations of the first pair of linear corrugations, the second bolt hole disposed between the linear corrugations of the second pair of linear corrugations.

2. The tube assembly according to claim 1, wherein the tabs and the corrugations project outwardly from the tube facing side of the sheet metal body, and wherein the tabs have a height greater than that of the corrugations.

3. The tube assembly according to claim 1, wherein the tube flange and the tube mounting surface are respectively made of a first and a second material, the second material of the tube mounting surface being softer that the first material of the tube flange, the corrugations of the gasket elastically or plastically deformed against the tube flange.

4. The tube assembly according to claim 3, wherein the sheet metal body is made out of stainless steel, and wherein the sheet metal body has a thickness comprised between 5 thou and 20 thou.

5. The tube assembly according to claim 4, wherein the sheet metal body has an anti-friction coating applied over one or more of the tube facing side and the engine component facing side.

6. The tube assembly according to claim 3, wherein the first material of the tube flange is stainless steel and the second material of the tube mounting surface is aluminum, and wherein the sheet metal body of the gasket is made of stainless steel, the corrugations deformed against the tube flange by a torque applied to the fasteners.

7. The tube assembly according to claim 6, wherein the sheet metal body has a thickness of about 7 thou.

8. The tube assembly according to claim 1, wherein the gasket is self-centered on the tube flange by a snap on engagement of the tabs with the peripheral wall of the tube flange.

9. The tube assembly according to claim 8, wherein the sheet metal body has a diamond shape including four straight side edges, and wherein the tabs include one or more tabs on each of the straight side edges.

10. The tube assembly according to claim 1, wherein the tube flange has a first side facing the engine component and a second opposed side, and wherein the tabs are disposed to clamp against the peripheral wall of the tube flange and to project beyond the peripheral wall on the second opposed side of the tube flange after the gasket has been snapped into position on the tube flange.

11. The tube assembly according to claim 10, wherein each of the tabs has a rounded lip formed at a free distal end thereof, the rounded lip accessible from the second opposed side of the tube flange.

12. A dual seal arrangement between a tube fitting and an accessory of a gas turbine engine, comprising:

an O-ring at a bore interface between the tube fitting and a fluid port of the accessory; and a metal gasket at a flange interface between a flange of the tube fitting and the accessory, the metal gasket having:
a tube fitting side and an accessory facing side;
deformable corrugations projecting from the tube fitting side;
spring-loaded tabs distributed about a perimeter of the metal gasket, the spring-loaded tabs projecting outwardly from the tube fitting side and disposed for resiliently grasping a peripheral wall of the flange of the tube fitting; and
a first and a second bolt hole disposed on opposed sides of a central hole, the central hole concentric with the O-ring at the bore interface, the spring-loaded tabs disposed around the central hole in diametrically opposed pairs, the first and second bolt holes disposed between adjacent ones of the spring-loaded tabs;
wherein the deformable corrugations include a first pair and a second pair of linear corrugations facing each other from the opposed sides of the central hole, the first bolt hole disposed between the linear corrugations of the first pair of linear corrugations, the second bolt hole disposed between the linear corrugations of the second pair of linear corrugations.

13. The dual seal arrangement according to claim 12, wherein the metal gasket has a diamond-shape sheet metal body including four straight sides joined by rounded corners, the spring-loaded tabs disposed centrally along the straight sides.

14. The dual seal arrangement according to claim 13, wherein a surface area of the metal gasket corresponds to that of the flange of the tube fitting, and wherein the metal gasket has a thickness ranging from 5 thou to 20 thou.

15. The dual seal arrangement according to claim 14, wherein an anti-friction coating is applied on the metal gasket.

16. The dual seal arrangement according to claim 12, wherein the metal gasket is made of a material having a surface hardness equal to that of the flange of the tube fitting.

17. The dual seal arrangement according to claim 16, wherein the surface hardness of the metal gasket is greater than that of a mating surface of the accessory.

18. The dual seal arrangement according to claim 12, wherein each of the spring-loaded tabs has a rounded lip formed at a free distal end thereof, the rounded lip forming an inwardly facing bump for engagement with the flange of the tube fitting.

19. The dual seal arrangement according to claim 12, wherein the spring-loaded tabs extend on opposed sides of the flange of the tube fitting to centralize the metal gasket relative to the flange of the tube fitting.

* * * * *